US010188986B2

(12) United States Patent
Goffe

(10) Patent No.: US 10,188,986 B2
(45) Date of Patent: Jan. 29, 2019

(54) ELECTROCHEMICAL REDUCTANT GENERATION WHILE DOSING DEF

(71) Applicant: Randal A. Goffe, Everett, WA (US)

(72) Inventor: Randal A. Goffe, Everett, WA (US)

(73) Assignee: PACCAR Inc, Bellevue, WA (US)

(*) Notice: Subject to any disclaimer, the term of this patent is extended or adjusted under 35 U.S.C. 154(b) by 432 days.

(21) Appl. No.: 14/935,094

(22) Filed: Nov. 6, 2015

(65) Prior Publication Data
US 2017/0128884 A1 May 11, 2017

(51) Int. Cl.
B01D 53/94 (2006.01)
F01N 3/20 (2006.01)
C25B 9/04 (2006.01)
C25B 11/04 (2006.01)
C25B 11/02 (2006.01)
(Continued)

(52) U.S. Cl.
CPC ............ B01D 53/9431 (2013.01); C25B 1/00 (2013.01); C25B 1/02 (2013.01); C25B 9/04 (2013.01); C25B 11/02 (2013.01); C25B 11/0415 (2013.01); F01N 3/2066 (2013.01); B01D 2251/2062 (2013.01); B01D 2259/124 (2013.01); F01N 2610/02 (2013.01); F01N 2610/1453 (2013.01); Y02T 10/24 (2013.01)

(58) Field of Classification Search
CPC .... C25B 1/00; C25B 1/02; C25B 9/04; C25B 11/02; C25B 11/0415; B01D 53/9431; B01D 2251/2062; F01N 3/2066; F01N 2610/02; Y02T 10/24
See application file for complete search history.

(56) References Cited

U.S. PATENT DOCUMENTS 858,904 A 7/1907 Ostwald
3,730,691 A 5/1973 Lang et al.
(Continued)

FOREIGN PATENT DOCUMENTS

CN 103866343 A * 6/2014 ............... C25B 1/00
CN 105363497 A 3/2016
(Continued)

OTHER PUBLICATIONS

Conway, R., et al., "Demonstration of SCR on a Diesel Particulate Filter System on a Heavy Duty Application," SAE Technical Paper 2015-01-1033, Apr. 14, 2015, Abstract.
(Continued)

Primary Examiner — Ciel P Thomas
(74) Attorney, Agent, or Firm — Christensen O'Connor; Johnson Kindness PLLC

(57) ABSTRACT

A diesel exhaust fluid (DEF) doser includes a DEF inlet configured to receive DEF, a DEF outlet configured to spray DEF out of the DEF doser, and an electrochemical cell. The electrochemical cell is located between the DEF inlet and the DEF outlet and couplable to a power source. The electrochemical cell is configured such that, when DEF is flowing from the DEF inlet to the DEF outlet and when the electrochemical cell is coupled to the power source, the electrochemical cell causes an electrolytic reaction in the DEF flowing from the DEF inlet to the DEF outlet to produce gaseous products in the DEF flowing from the DEF inlet to the DEF outlet, and wherein the gaseous products comprise one or more of $H_2$ or $NH_3$.

22 Claims, 7 Drawing Sheets

(51) Int. Cl.
*C25B 1/00* (2006.01)
*C25B 1/02* (2006.01)

(56) References Cited

U.S. PATENT DOCUMENTS

| | | | |
|---|---|---|---|
| 4,711,871 A | 12/1987 | Wachs et al. | |
| 4,929,581 A | 5/1990 | Steinwandel et al. | |
| 5,149,512 A | 9/1992 | Li et al. | |
| 6,475,944 B1 | 11/2002 | Yang et al. | |
| 6,826,906 B2 | 12/2004 | Kakwani et al. | |
| 7,078,004 B2 | 7/2006 | Voss et al. | |
| 7,229,597 B2 | 6/2007 | Patchett et al. | |
| 7,902,107 B2 | 3/2011 | Patchett et al. | |
| 7,998,423 B2 | 8/2011 | Boorse et al. | |
| 8,017,543 B2 | 9/2011 | Andy et al. | |
| 8,119,088 B2 | 2/2012 | Boorse et al. | |
| 8,501,132 B2 | 8/2013 | Fu et al. | |
| 8,568,675 B2 | 10/2013 | Deeba et al. | |
| 8,667,785 B2 | 3/2014 | Blakeman et al. | |
| 8,679,434 B1 | 3/2014 | Li et al. | |
| 8,828,900 B2 | 9/2014 | Takagi et al. | |
| 8,989,637 B2 | 3/2015 | Yoshii | |
| 9,005,559 B2 | 4/2015 | Sumiya et al. | |
| 9,034,269 B2 | 5/2015 | Hilgendorff et al. | |
| 9,737,877 B2 | 8/2017 | Goffe | |
| 9,757,691 B2 | 9/2017 | Goffe | |
| 9,764,287 B2 | 9/2017 | Goffe | |
| 2006/0049063 A1* | 3/2006 | Murphy | C25B 1/00 205/552 |
| 2006/0057046 A1 | 3/2006 | Punke et al. | |
| 2008/0314027 A1 | 12/2008 | Barber et al. | |
| 2010/0146950 A1 | 6/2010 | Hayashi et al. | |
| 2010/0172828 A1 | 7/2010 | Althoff et al. | |
| 2010/0180580 A1 | 7/2010 | Boorse et al. | |
| 2011/0142737 A1 | 6/2011 | Seyler et al. | |
| 2011/0250114 A1 | 10/2011 | Augustine et al. | |
| 2011/0302909 A1* | 12/2011 | Botte | C25B 1/00 60/274 |
| 2012/0058034 A1 | 3/2012 | Ogunwumi et al. | |
| 2012/0121486 A1 | 5/2012 | Collier et al. | |
| 2012/0175247 A1* | 7/2012 | Darrel | C25B 1/04 204/229.3 |
| 2012/0230881 A1 | 9/2012 | Boger et al. | |
| 2013/0102819 A1 | 4/2013 | Szesni et al. | |
| 2013/0121902 A1 | 5/2013 | Adelmann et al. | |
| 2014/0041366 A1 | 2/2014 | Seyler et al. | |
| 2014/0044627 A1 | 2/2014 | Siani et al. | |
| 2014/0140909 A1 | 5/2014 | Qi et al. | |
| 2014/0193746 A1 | 7/2014 | Cerri et al. | |
| 2014/0227155 A1 | 8/2014 | Phillips et al. | |
| 2015/0017075 A1 | 1/2015 | Jinbo et al. | |
| 2015/0017083 A1 | 1/2015 | Maunula | |
| 2015/0209766 A1 | 7/2015 | Xavier et al. | |
| 2015/0360212 A1 | 12/2015 | Chandler et al. | |
| 2016/0040576 A1 | 2/2016 | Chandler et al. | |
| 2016/0045868 A1 | 2/2016 | Sonntag et al. | |
| 2016/0074809 A1 | 3/2016 | Goffe | |
| 2016/0074839 A1 | 3/2016 | Goffe | |
| 2016/0136617 A1 | 5/2016 | Nazarpoor et al. | |
| 2016/0214086 A1 | 7/2016 | Ano et al. | |
| 2016/0339389 A1 | 11/2016 | Hoke et al. | |
| 2016/0346765 A1 | 12/2016 | Nazarpoor et al. | |
| 2017/0128881 A1 | 5/2017 | Goffe | |
| 2017/0128885 A1 | 5/2017 | Goffe | |
| 2017/0320014 A1* | 11/2017 | Hanson | B01D 53/79 |

FOREIGN PATENT DOCUMENTS

| | | |
|---|---|---|
| EP | 1945356 A1 | 7/2008 |
| GB | 2504024 B | 3/2014 |
| WO | 2008/094889 A1 | 8/2008 |
| WO | 2012/059144 A1 | 5/2012 |
| WO | 2014027207 A1 | 2/2014 |

OTHER PUBLICATIONS

Devarakonda, M.N., et al., "Technical Challenges in the Integration of DPF and SCR Aftertreatment—Review From a Systems and Modeling Perspective," 12th DOE Cross-Cut Workshop on Lean Exhaust Emissions Reduction Simulations [CLEERS], Apr. 28-30, 2009, Dearborn, Mich., Abstract, 1 page.

Devarakonda, M.N., et al., "Technical Challenges in the Integration of DPF and SCR Aftertreatment on a Single Substrate—Review From a Systems and Modeling Perspective," presented by Maruthi N. Devarakonda at 12th DOE Cross-Cut Workshop on Lean Exhaust Emissions Reduction Simulations [CLEERS], Apr. 28-30, 2009, Dearborn, Mich., Apr. 29, 2009, 22 pages.

"Engine Aftertreatment Systems: Operator's Manual," No. Y53-1090C, PACCAR Inc, Bellevue, Wash., 2011, 42 pages.

Geisselmann, A., "Future Aftertreatment Concepts for Heavy Duty Application," Abstract in SAE 2014 Heavy Duty Diesel Emissions Control Symposium, Event Guide, Gothenburg, Sweden, Sep. 17-18, 2014, p. 25.

Goffe, R.A., and D.M. Mason, "Electrocatalytic Oxidation of Hydrocarbons on a Stabilized-Zirconia Electrolyte Employing Gold or Platinum Electrodes," Journal of Applied Electrochemistry 11(4):447-452, Jul. 1981.

Kwak, J.H., et al., "Effects of Hydrothermal Aging on $NH_3$—SCR Reaction Over Cu/Zeolites," Journal of Catalysis 287(1):203-209, Mar. 2012.

Kwak, J.H., et al., "Excellent Activity and Selectivity of Cu-SSZ-13 in the Selective Catalytic Reduction of NO(x) and $NH_3$," Journal of Catalysis 275(2):187-190, Oct. 2010.

Rappé, K.G., "Combination and Integration of DPF-SCR Aftertreatment Technologies," presented by Kenneth G. Rappé at Annual Merit Review and Peer Evaluation, May 16, 2012, 24 pages.

Rappé, K.G., and G.D. Maupin, "III.6 Integration of DPF & SCR Technologies for Combined Soot and NO(x) After-Treatment," Advanced Combustion Engine R&D, FY 2014 Annual Report, Pacific Northwest National Laboratory, Richland, Wash., pp. III-30-III-33.

Rappé, K.G., et al., "Combination & Integration of DPF-SCR Aftertreatment," presented by Kenneth G. Rappé at Directions in Engine-Efficiency and Emissions Research Conference [DEER 2011], Detroit, Mich., Oct. 5, 2011, 18 pages.

Rappé, K.G., et al., "Combination & Integration of DPF-SCR Aftertreatment," presented by Kenneth G. Rappé at Directions in Engine-Efficiency and Emissions Research Conference [DEER 2012], Dearborn, Mich., Oct. 18, 2012, 34 pages.

Rappé, K.G., et al., "Combination and Integration of DPF-SCR Aftertreatment Technologies," presented by Darrell R. Herling at the DOE Annual Merit Review and Peer Evaluation, Arlington, Va., May 11, 2011, 24 pages.

Rappé, K.G., et al., "Combination and Integration of DPF-SCR Aftertreatment Technologies," presented by Darrell R. Herling at the DOE Annual Merit Review and Peer Evaluation, Washington, D.C., Jun. 9, 2010, 16 pages.

Rappé, K.G., et al., "II.6.12 Combination and Integration of DPF-SCR After-Treatment," Advanced Combustion Engine R&D, FY 2011 Annual Report, Pacific Northwest National Laboratory, Richland, Wash., pp. 227-230.

Storey, J.M.E., et al., "Characterization of Urea Decomposition Products in Selective Catalytic Reduction Catalyst Systems," Abstracts of Papers of the American Chemical Society, Washington, D.C., 2011, vol. 242, 2 pages.

Ye, Q., et al., "Activity, Propene Poisoning Resistance and Hydrothermal Stability of Copper Exchanged Chabazite-Like Zeolite Catalysts for SCR of NO With Ammonia in Comparison to Cu/ZSM-5," Applied Catalysis A: General 427-428:24-34, Jun. 2012.

Koebel, M., and E.O. Strutz, "Thermal and Hydrolytic Decomposition of Urea for Automotive Selective Catalytic Reduction Systems: Thermochemical and Practical Aspects," Industrial and Engineering Chemistry Research 42(10):2093-2100, May 2003.

Köster, K., et al., "Regeneration of Hemofiltrate by Anodic Oxidation of Urea," Artificial Organs 7(2):163-168, May 1983.

(56) References Cited

OTHER PUBLICATIONS

Patzer II, J.F., et al., "Urea Oxidation Kinetics via Cyclic Voltammetry: Application to Regenerative Hemodialysis," Bioelectrochemistry and Bioenergetics 276(3):341-353, Dec. 1989.

Patzer II, J.F., et al., "Voltage Polarity Relay—Optimal Control of Electrochemical Urea Oxidation," IEEE Transactions on Biomedical Engineering 38(11):1157-1162, Nov. 1991.

Yao, S.J., et al., "Anodic Oxidation of Urea and an Electrochemical Approach to De-ureation," Nature 241(5390):471-472, Feb. 1973.

International Search Report and Written Opinion dated Mar. 30, 2017, issued in corresponding PCT/US2016/060583, filed Nov. 4, 2016, 7 pages.

Office Action dated Dec. 1, 2016, from related U.S. Appl. No. 14/934,955, filed Nov. 6, 2015, 20 pages.

Office Action dated Dec. 16, 2016, from related U.S. Appl. No. 14/935,001, filed Nov. 6, 2015, 7 pages.

Office Action dated Jan. 19, 2017, from related U.S. Appl. No. 14/935,199, filed Nov. 6, 2015, 19 pages.

Office Action dated Jan. 23, 2017, from related U.S. Appl. No. 14/935,048, filed Nov. 6, 2015, 9 pages.

\* cited by examiner

ELECTROCHEMICAL REDUCTANT GENERATION WHILE DOSING DEF

CROSS-REFERENCES TO RELATED APPLICATIONS

The present application is related to U.S. patent application Ser. No. 14/935,048, filed Nov. 6, 2015; to U.S. patent application Ser. No. 14/935,199, filed Nov. 6, 2015; to U.S. patent application Ser. No. 14/935,125, filed Nov. 6, 2015; to U.S. patent application Ser. No. 14/934,955, filed Nov. 6, 2015; and to U.S. patent application Ser. No. 14/935,001, filed herewith Nov. 6, 2015, each expressly incorporated herein by reference in its entirety.

BACKGROUND

Regulatory air pollution limits for diesel engines have caused some manufacturers to adopt selective catalytic reduction (SCR) technology for reducing nitrogen oxides (NOx) in engine exhaust. The SCR process introduces a diesel exhaust fluid (DEF), such as an NOx reducing compound (e.g., a urea water solution), into the hot exhaust gas. The DEF chemically reduces pollutant compounds, such as NOx, into non-pollutant compounds in conjunction with a catalyst.

Introduction of DEF into exhaust is typically achieved by a doser (e.g., a port) injecting (e.g., spraying) an aqueous DEF solution as a stream of small droplets into a stream of exhaust. However, during typical operation of an engine, the conditions for mixing dosed DEF with exhaust and the conditions for the SCR process are not optimal. For example, the temperature of the exhaust is not optimal (i.e., either too hot or too cold), the amount of DEF introduced to the exhaust is not optimal (i.e., either too much or too little DEF is introduced into the exhaust), or DEF does not sufficiently mix with the exhaust. When DEF introduced into exhaust that does not undergo the SCR process (e.g., too much DEF for the exhaust temperature), DEF crystals will accumulate within the exhaust system, both on the interior surface of the exhaust pipe and at the DEF doser. Buildup of DEF crystals in the exhaust system detrimentally affects the performance of the exhaust system, and also is indicative of inefficiency in the SCR process: DEF crystals represent both wasted DEF solution and reduced SCR efficiency. During injection of DEF into the diesel exhaust stream during SCR there is a significant amount of the total DEF injected that contacts the walls of the exhaust pipe and becomes a liquid wall film. While this process occurs, the DEF that is wetting the pipe walls does not reach the catalyst for its intended use and the intended quantity of reactant is not available in the catalyst.

Recent developments in engine aftertreatment system design have been moving increasingly towards more compact, smaller volume systems. From the viewpoint of DEF dosing and decomposition, this is diametrically opposite to what is most desirable. In order to compensate for the negative impact caused by these trends, a very large emphasis has been place upon mixer design and to facilitate more efficient DEF decomposition to produce $NH_3$, both of which has met with limited success. A system is needed to reduce the negative effects from DEF injection and mixing with exhaust to reduce the amount of DEF that wets the pipe walls and reduce the amount of crystallization of DEF that does not undergo the SCR process, while still providing efficient mixing of DEF with exhaust for the SCR process.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a diesel exhaust fluid (DEF) doser includes a DEF inlet configured to receive DEF, a DEF outlet configured to spray DEF out of the DEF doser, and an electrochemical cell. The electrochemical cell is located between the DEF inlet and the DEF outlet and couplable to a power source. The electrochemical cell is configured such that, when DEF is flowing from the DEF inlet to the DEF outlet and when the electrochemical cell is coupled to the power source, the electrochemical cell causes an electrolytic reaction in the DEF flowing from the DEF inlet to the DEF outlet to produce gaseous products in the DEF flowing from the DEF inlet to the DEF outlet, and wherein the gaseous products include one or more of $H_2$ or $NH_3$.

In one example, the power source is coupled to a wave form generator configured to vary electrical power from the power source. In another example, the electrochemical cell includes two electrodes configured to be couplable to the power source and the two electrodes form portions of an anode compartment and a cathode compartment between the DEF inlet and the DEF outlet. In another example, at least one of the two electrodes includes at least one of platinum, palladium, nickel, rhodium, ruthenium, tungsten, or titanium. In another example, at least one of the two electrodes includes a metal material of a porous sintered construction and the DEF doser further includes a solid ionically conducting material located between portions of the two electrodes. In another example, the ionically conducting material includes a proton conducting material configured to be impregnated with hydrophilic mineral particles.

In another example, the power source is configured to activate the electrochemical cell with an applied constant voltage up to about 10V. In another example, the power source is configured to activate the electrochemical cell with a pulsed voltage in a range from about −10V to about 10V at a time interval between about 1 μs and about 1 ms. In another example, a current density of the electrolytic reaction in the DEF flowing from the DEF inlet to the DEF outlet caused by the pulsed voltage is in a range from about 1 μA and about 1 mA. In another example, the power source is configured to drive the electrochemical cell with a pulsed voltage that is timed based on a pulsed flow pattern of DEF spray out of the DEF outlet. In another example, a droplet size of DEF spray out of the DEF outlet is controlled based on an applied voltage from the power source.

In another example, the electrochemical cell is configured such that a droplet size of DEF spray out of the DEF outlet when the electrolytic reaction occurs in the DEF flowing from the DEF inlet to the DEF outlet is smaller than a droplet size of DEF spray out of the DEF outlet when the electrolytic reaction does not occur. In another example, the electrolytic reaction includes electro-active vaporization, wherein the electro-active vaporization includes water electrolysis in the DEF flowing from the DEF inlet to the DEF outlet and accelerated production of the gaseous products in the DEF flowing from the DEF inlet to the DEF outlet. In another example, the electrochemical cell is configured such that an applied voltage to the electrochemical cell causes discharge of one or more DEF deposits at the DEF outlet.

In another embodiment, a diesel exhaust system has a flow channel configured to direct diesel exhaust into a mixing chamber, a diesel exhaust fluid (DEF) doser configured to spray DEF into the diesel exhaust in the mixing chamber, and a power source coupled to the DEF doser and configured to provide an applied voltage to the DEF doser. The DEF doser includes an electrochemical cell configured such that, when the applied voltage is provided by the power source, the electrochemical cell causes an electrolytic reaction in the DEF to produce gaseous products in the DEF before the DEF is sprayed into the mixing chamber, and wherein the gaseous products include one or more of $H_2$ or $NH_3$.

In one example, the gaseous products produced in the electrolytic reaction cause the sprayed DEF to mix with the diesel exhaust in the mixing chamber more rapidly than sprayed DEF without the gaseous products mixed with the diesel exhaust in the mixing chamber. In another example, the power source includes a wave form generator configured to vary electrical power in the applied voltage from the power source to the DEF doser. In another example, the electrochemical cell includes two electrodes configured to be couplable to the power source and the two electrodes form portions of an anode compartment and a cathode compartment between the DEF inlet and the DEF outlet.

In another example, at least one of the two electrodes includes a metal material of a porous sintered construction and the DEF doser further includes a solid ionically conducting material located between portions of the two electrodes. In another example, the ionically conducting material includes a proton conducting material configured to be impregnated with hydrophilic mineral particles.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
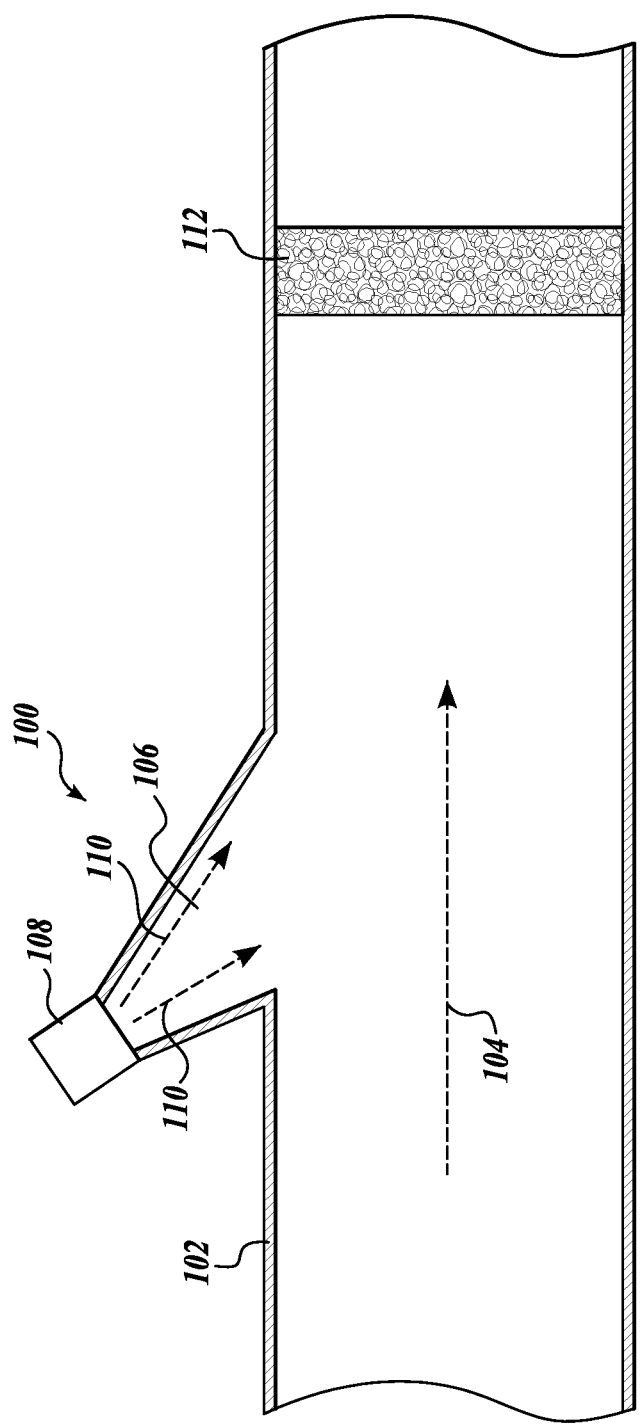
FIG. 1 depicts an embodiment of a system for sidewall injection of DEF into an exhaust stream, in accordance with the embodiments described herein.

The detailed description set forth below in connection with the appended drawings is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the invention to the precise forms disclosed. Similarly, any steps described herein may be interchangeable with other steps, or combinations of steps, in order to achieve the same or substantially similar result.

Emissions control for engine exhaust systems is predicated upon the use of a reductant, most typically $NH_3$, reacting with diesel exhaust to neutralize potential pollutants, such as NOx. In some embodiments, the method for routine delivery of this reductant to the site of reaction in the SCR system is via thermolysis of diesel exhaust fluid (DEF), such as a 32.5% urea solution, into the engine aftertreatment system. The DEF is typically introduced in the form of a spray (e.g., dosing) into a decomposition pipe or equivalent chamber, in order to facilitate water evaporation, thermolysis into $NH_3$ and HNCO, and hydrolysis of HNCO to produce additional $NH_3$ and $CO_2$. There are many problems that arise from this process for engine aftertreatment system (EAS) design for heavy duty diesel (HDD).

Some of the challenges associated with the use of DEF in an EAS include the following. In one example, frequent internal plugging of a DEF doser tip results from DEF byproduct formation upon standing (e.g., overnight standing) due to high temperatures when the truck is abruptly turned off after route use. Cleaning such clogged DEF dosers is very challenging. In another example, complex DEF byproducts can be formed and deposit at various undesirable locations in the EAS. In another example, over-dosing occurs due to slow thermal decomposition kinetics, which can cause $NH_3$ to slip through the tailpipe and derating of the vehicle (down to only 5 miles per hour, when on-board diagnostic fault codes are activated). In another example, large concentrations of HNCO gas is produced along with $NH_3$ by thermal decomposition, resulting in undesirable deposits (or crystals) forming in the pipes and on the SCR catalyst surfaces and/or HNCO slipping through the tailpipe. In another example, the formation of deposits from DEF dosing causes mass imbalance of the mass of DEF delivered and the mass of $NH_3$ made available for NOx reduction, resulting in higher DEF consumption costs. In another example, in relatively low temperature engine operating conditions (e.g., pick-up and delivery drive cycles of diesel trucks), DEF deposit accumulation in the EAS is most pronounced. Thus, at SCR temperatures below 190° C., DEF dosing is currently not practiced in spite of the engine out NOx produced under such conditions (including cold start conditions). Many other consequences of DEF deposit formation are numerous and varied, resulting in product failures that increase warranty costs and erode consumer confidence in the brand. In another example, at high engine out NOx operating conditions, considerable amounts of DEF deposit formation can be seen to accumulate in the SCR catalyst and prolonged operation with DEF deposits on the SCR catalyst has been shown to result in physical damage of both the catalyst and the cordierite substrate monolith material.

One proposed solution has been the use of $TiO_2$-based urea hydrolysis catalyst. However, the use of $TiO_2$-based urea hydrolysis catalyst has met with limited success. This limited success is primarily due to poor thermal stability of $TiO_2$, the fact that $TiO_2$ only catalyzes the hydrolysis of HNCO (which requires water to first evaporate from the droplets in the spray followed by thermal decomposition of DEF to $NH_3$ and HNCO in order to be effective), and the need for thermolysis to occur before such a catalyst may become effective (i.e., effective dosing can only occur above certain temperatures). Hence, the emerging need for relatively low temperature SCR operation cannot employ this technology.

Technologies that deliver $NH_3$ reductant more efficiently are gaining more interest in the industry. These include the use of conventional ($TiO_2$) hydrolysis catalysts coated onto electrically heated metallic mixers and solid state $NH_3$ storage devices. With conventional ($TiO_2$) hydrolysis catalysts coated onto electrically heated metallic mixers, DEF is sprayed in order to ensure the thermolysis proceeds in spite of relatively low system temperatures. However, this technology is still intrinsically limited by the aforementioned shortcomings of $TiO_2$-based catalysts. Solid state $NH_3$ storage devices are able to release gaseous $NH_3$ onboard the truck without the use of DEF.

Embodiments of the present disclosure are directed to electro-activatable diesel exhaust fluid (DEF) dosers. Such DEF dosers inject DEF, such as a nitrogen-oxides reductant solution (e.g., urea), into exhaust gas before the exhaust gas reaches a selective catalytic reduction (SCR) system. In embodiments of DEF dosers disclosed herein, DEF passes from a DEF inlet to a DEF outlet. An electrochemical cell is located between the DEF inlet and the DEF outlet and couplable to a power source. The electrochemical cell is configured such that, when DEF is flowing from the DEF inlet to the DEF outlet and when the electrochemical cell is coupled to the power source, the electrochemical cell causes an electrolytic reaction in the DEF flowing from the DEF inlet to the DEF outlet to produce gaseous products in the DEF flowing from the DEF inlet to the DEF outlet. The gaseous products include one or more of $H_2$ or $NH_3$. Among other benefits, the production of the gaseous products in the DEF doser reduces the droplet size of the DEF that is sprayed out of the DEF outlet into the exhaust gas and decreases the amount of crystallized DEF buildup near the DEF outlet.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known aspects have not been described in detail in order to not unnecessarily obscure various aspects of the present disclosure. Further, it will be appreciated that embodiments of the present disclosure may employ any combination of features described herein.

While urea is presently a preferred DEF used in the automotive industry for reducing nitrogen oxides in diesel exhaust, the present disclosure is not limited to apparatus for use in injecting a urea solution. Other forms of DEF, such as nitrogen-oxides reductant solutions (e.g., ammonia), will benefit from injection using the provided examples of DEF dosers. Furthermore, the provided examples are not limited to the injection of a nitrogen oxides reductant solution, but are useful for injection of any liquid into a gaseous flow.

The SCR systems typically include an SCR catalyst configured to facilitate hydrolysis of a portion of the thermolysis decomposition product from DEF. In some embodiments, chemical processes that occur during the DEF atomization and SCR process include:

$H_2O$ evaporation . . . (endothermic)     (1)

DEF→$NH_3$+HNCO . . . (endothermic)     (2)

HNCO+$H_2O$→$NH_3$+$CO_2$ . . . (hydrolysis)     (3)

Both reactions (1) and (2) are thermal processes and, as such, they are directly dependent upon engine exhaust flow conditions. However, at or above 300° C., these reactions typically proceed rapidly. Reaction (3) is a limiting step, as it proceeds slowly in the gas phase and requires contact with a catalyst surface to achieve reasonable reaction rates. An SCR catalyst can serve this purpose under these circumstances. This is one reason for inclusion of metal oxides of titanium, tungsten and zirconium in SCR catalyst formulations. At low temperatures, the SCR catalyst can play a crucial role in hydrolyzing HNCO and providing more $NH_3$ for the SCR reaction to proceed. Also, HNCO hydrolysis helps to prevent significant localized accumulation of HNCO that may result in deposit formation. The primary function of the SCR is NOx reduction reaction. Any hydrolysis of DEF (e.g., urea) or DEF byproduct carried out by the SCR is undesirable and only necessitated by a failure to obtain rapid and more complete decomposition and mixing of the DEF. SCR catalyst size can be reduced significantly if a method can be found to efficiently perform reaction (3) and/or directly hydrolyze DEF, such as urea, as shown in reaction (4):

$H_2NCONH_2$+$H_2O$→$2NH_3$+$CO_2$ . . . (urea hydrolysis)     (4)

When atomized DEF solution comes into contact with surfaces (i.e., impinges on the surfaces) due to mal-distribution of DEF, the spray will have a cooling effect. With lower temperatures, the rate of the thermally driven reactions (1) and (2) are negatively impacted. Ultimately, this can lead to deposit formation. This presents a major challenge for achieving efficient mixing in compact EAS. Impingement is directly linked with both DEF deposit formation and mal-distribution of flow and $NH_3$ uniformity. Static mixers are routinely used in EASs to achieve mixing of atomized DEF solution droplets and engine exhaust. Despite the common occurrence of DEF deposits at or in the vicinity of the mixer, and even a foot or more downstream of the mixer, the EAS can be operated to meet emission standards.

The SCR system components (e.g., a mixer, connecting pipes, etc.) can be coated with a catalyst. In one embodiment, the DEF hydrolysis catalyst is coated on a wire mesh of a tortuous path static mixer to achieve efficient hydrolysis of DEF into $NH_3$ (see equation (4)). The coating can also minimize or eliminate HNCO or deposit formation. In one embodiment, the catalyst enables dosing of DEF in the mixing chamber at relatively low temperatures (i.e., down as low as about 150° C.). In one embodiment, at least a portion of the internal wall surfaces, up to the entire portion of the internal wall surfaces, of the mixing chamber and connecting pipes can be coated with a catalyst to enhance conversion of DEF to gaseous ammonia and to minimize DEF deposit formation.

In one embodiment, the SCR catalyst is an 8 mol % yttria-stabilized zirconia. The catalyst is formed into a wash coat formulation that comprises 3.0 g catalyst, 4.4 g polyethylene oxide binder, 0.5 g polyethylene oxide/polypropylene oxide surfactant, 2.2 g water suspension medium. The wash coat formulation is stirred vigorously by hand, allowed to degas for 30 minutes, employed in dip coating pieces of wire mesh, and retrieved from a sample wire mesh mixer. The coated wire is air dried in a fume hood for 15 minutes, then transferred to an oven for drying and sintering of the catalyst particle to form a coherent coating, as follows: 15 minutes at 105° C. and 60 minutes at 500° C. Results from scanning electron microscope and energy-dispersive X-ray spectroscopy analysis of the resulting wash coat was analyzed to confirm the effectiveness of the wash coat application of portions of a wire mesh mixer. The same wash coat formulation was used to coat an alumina thermogravimetric analysis (TGA) pan. The catalyst-coated pan produced similar TGA results for DEF hydrolysis as using pristine catalyst powder added to 50% DEF solution in catalyst screening studies. Other examples of catalysts and reactors are described, for example, in Example 5 of U.S. patent application Ser. No. 14/486,858, which is hereby incorporated by reference in its entirety.

Figure 2:
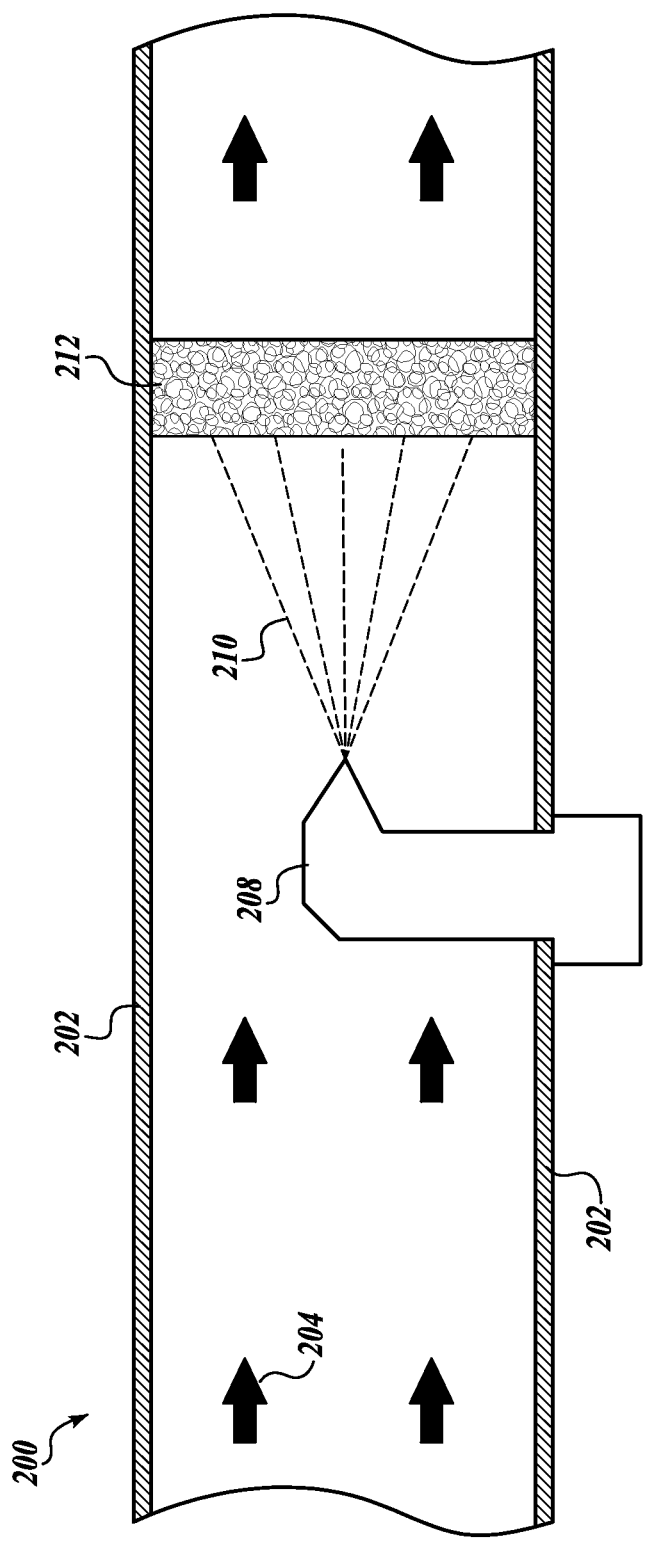
FIG. 2 depicts an embodiment of a system for central injection of DEF into an exhaust stream, in accordance with the embodiments described herein.
Figure 3:
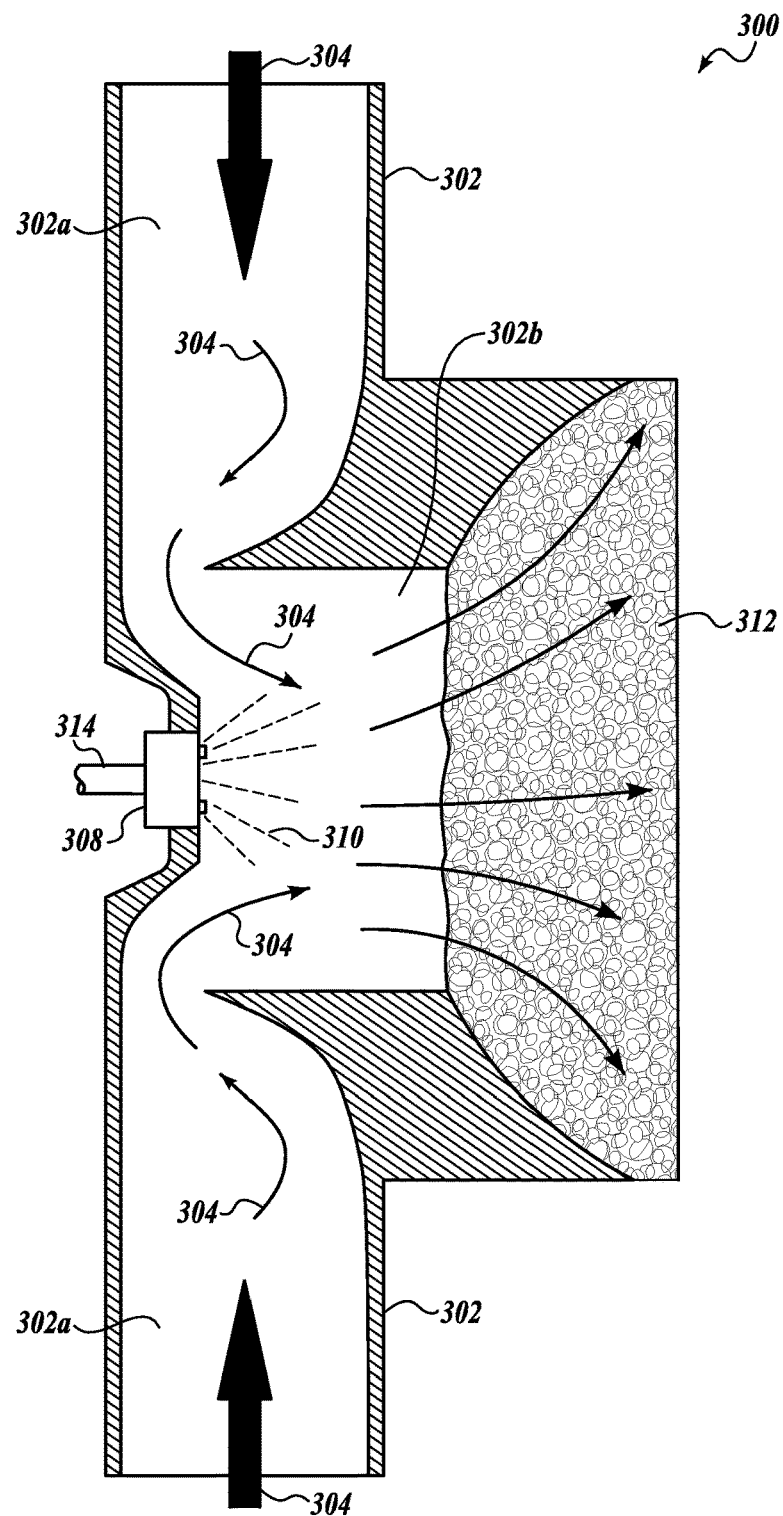
FIG. 3 depicts an embodiment of a system for central, non-disruptive injection of DEF into an exhaust stream, in accordance with the embodiments described herein.

Systems for reducing wall wetting during DEF injection have been developed. Examples of DEF dosers (sometimes called "ports" or "injectors") are depicted in FIGS. 1 to 3. FIG. 1 depicts an embodiment of a system 100 for sidewall injection of DEF into an exhaust stream. The system 100 includes an exhaust pipe 102 through which a stream of exhaust gas 104 flows. A chamber 106 is formed in a sidewall of the exhaust pipe 102. A doser 108 is located in the chamber 106 in the sidewall of the exhaust pipe 102. The doser 108 is configured to inject DEF 110 through the chamber 106 into the exhaust gas 104. In this way, the DEF 110 is injected into the exhaust gas 104 before the exhaust gas 104 reaches an SCR system 112. A mixture of the DEF 110 and the exhaust gas 104 undergoes the SCR process in the SCR system 112.

The system 100 depicted in FIG. 1 does not eliminate the wall-wetting effect. For example, the flow of the exhaust gas 104 causes the gases in the system 100 to move at high velocities. In turn, these high gas velocities push droplets of the DEF 110 (e.g., urea) into the walls that define the chamber 106. A droplet that impacts a wall typically sticks to the wall and forms a liquid film of DEF. Under certain temperature conditions, the wall film will then form undesirable DEF crystals.

FIG. 2 depicts an embodiment of a system 200 for central injection of DEF into an exhaust stream. The system 200 includes an exhaust pipe 202 through which a stream of exhaust gas 204 flows. A doser 208 is located in the exhaust pipe 202 such that the doser 208 is configured to inject DEF 210 into the exhaust gas 204 at a central location of the exhaust pipe 202. In this way, the DEF 210 is injected into the exhaust gas 204 before the exhaust gas 204 reaches an SCR system 212. A mixture of the DEF 210 and the exhaust gas 204 undergoes the SCR process in the SCR system 212.

The system 200 shown in FIG. 2 injects DEF 210 into the exhaust gas 204 at a location that is separated from the inner surface of the exhaust pipe 202, but has been reported to have limited success due to inconsistent results. In particular, the system 200 can allow relatively high HNCO concentrations to accumulate, making the system 200 susceptible to deposit formation and/or DEF crystallization that requires further SCR catalyst involvement to achieve full hydrolysis. One issue with the design shown in FIG. 2 is the portion of the DEF doser 208 that protrudes from the exhaust pipe 202 to the point at which the DEF 210 is sprayed out of the doser 208. While this arrangement allows the DEF 210 to be injected at a location that is separated from the inner surface of the exhaust pipe 202, the protrusion of the DEF doser 208 from the exhaust pipe 202 can disrupt the flow patterns of exhaust gas 204 through the exhaust pipe 202 as it passes the DEF doser 208. The disrupted flow patterns reduce the efficiency of the mixing of the DEF 210 with the exhaust gas 204, resulting is more DEF 210 wetting the walls of the exhaust pipe 202, accumulating within the system 200, and/or crystallizing within the system 200.

FIG. 3 depicts an embodiment of a system 300 for central, non-disruptive injection of DEF into an exhaust stream. The system 300 includes an exhaust pipe 302 through which a stream of exhaust gas 304 flows. The exhaust pipe 302 includes insertion pipes 302a and a mixing pipe 302b. A DEF doser 308 is located in the exhaust pipe 302 such that the doser 308 is configured to inject DEF 310 into the exhaust gas 304 in the mixing pipe 302b after the exhaust gas 304 passes out of the insertion pipes 302a into the mixing pipe 302b. The DEF 310 is injected into the exhaust gas 304 before the exhaust gas 304 reaches a tortuous path static mixer 312 in a compact configuration. A mixture of the DEF 310 and the exhaust gas 304 undergoes mixing in the tortuous path static mixer. The doser 308 is fed with DEF by a supply line 314. The DEF 310 and exhaust gas 304 mixture proceeds from the tortuous path static mixer 312 to undergo the SCR process in the SCR (not shown).

Neither the DEF doser 308 nor the supply line 314 is located within the exhaust pipe 302. In this arrangement, the DEF doser 308 and the supply line 314 do not affect the flow patterns of the exhaust gas 304 through the exhaust pipe 302. This improves the efficiency of mixing of the exhaust gas 304 with the DEF 310. In some embodiments, the system 300 includes one or more of baffles, wall texturing, or other features to increase turbulence in the flow of exhaust gas 304 to increase efficiency of the mixing of the exhaust gas 304 with the DEF 310. Such features are described in U.S. application Ser. No. 14/486,217, the contents of which are hereby incorporated by reference in their entirety. While the system 300 may be an improvement over the systems 100 and 200 in the mixing of DEF with exhaust gas and in reducing DEF wall wetting, the system 300 may still be susceptible to DEF accumulation and/or DEF crystallization, especially at points where the DEF doser 308 sprays the DEF 310.

Figure 4:
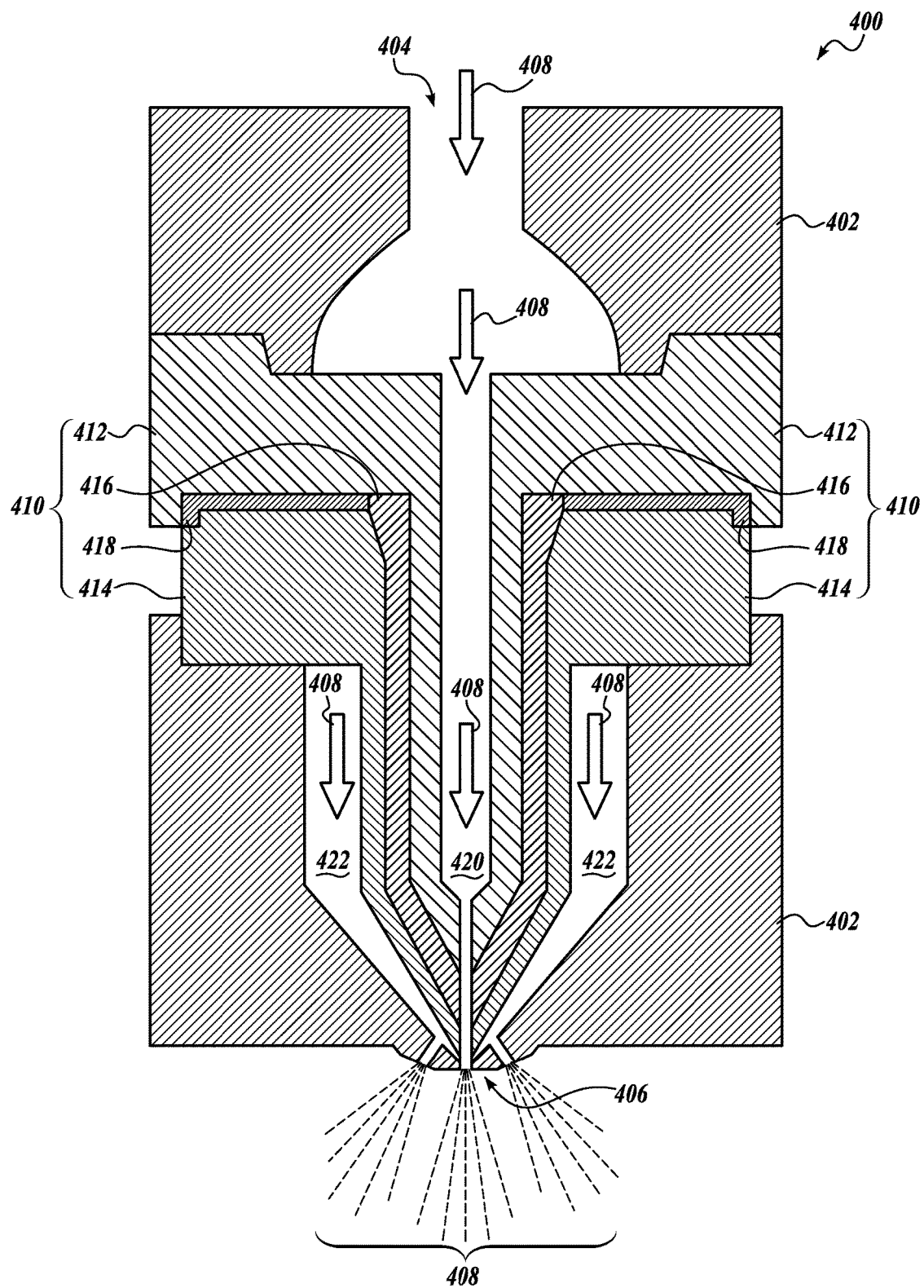
FIG. 4 depicts a cross-sectional view of an embodiment of an electro-activated DEF doser, in accordance with the embodiments described herein.

Depicted in FIG. 4 is a cross-sectional view of an embodiment of an electro-activated DEF doser 400. The DEF doser 400 includes a housing 402 that includes a DEF inlet 404 and a DEF outlet 406. In some embodiments, the housing 402 is made from a material that is electrically-insulating and chemically-inert to DEF. The DEF inlet 404 is configured to receive DEF 408. The housing 402 is arranged to direct the DEF 408 received by the DEF inlet 404 to the DEF outlet 406. The DEF outlet 406 is configured to spray DEF 408 out of the DEF doser 400. In some embodiments, the DEF outlet 406 includes a plurality of outlet orifices (as depicted in FIG. 4) or a single outlet orifice.

The DEF doser 400 also includes an electrochemical cell 410. The electrochemical cell 410 is located between the DEF inlet 404 and the DEF outlet 406. The electrochemical cell 410 is couplable to a power source (not shown). When the electrochemical cell 410 is coupled to the power source, the electrochemical cell 410 causes an electrolytic reaction in the DEF 408 flowing from the DEF inlet 404 to the DEF outlet 406 to produce gaseous products in the DEF 408 flowing from the DEF inlet 404 to the DEF outlet 406. In some embodiments, the gaseous products include $H_2$ and/or $NH_3$. In some embodiments, the gaseous products include one or more of $H_2$, $NH_3$, $CO_2$, any other gaseous product, or any combination thereof.

In the embodiment shown in FIG. 4, the electrochemical cell 410 includes a first electrode 412, a second electrode 414, a solid ionically conducting material 416, and an insulating layer 418. In some embodiments, the first and second electrodes 412 and 414 are couplable to the power source such that an electrical energy applied to the first and second electrodes 412 and 414 by the power source results in the electrolytic reaction in the DEF 408 flowing from the DEF inlet 404 to the DEF outlet 406 to produce the gaseous products. In some embodiments, one or both of the first and second electrodes 412 and 414 includes a metal material of a porous sintered construction. In some embodiments, one or both of the first and second electrodes 412 and 414 includes platinum, palladium, nickel, rhodium, ruthenium, tungsten, titanium, or any combination thereof.

In the embodiment shown in FIG. 4, the first electrode 412 is an anode that forms a portion of an anode compartment 420 and the second electrode 414 is a cathode that forms a portion of a cathode compartment 422. In one example, when the electrochemical cell 410 is powered by the power source, the first electrode 412 (anode) is positively charged and causes an electrolytic reaction in the anode compartment 420 that generates $NH_3$. In some embodiments, the electrolytic reaction in the anode compartment 420 also generates $CO_2$. In one example, $NH_3$ and $CO_2$ are generated through electrochemical oxidation of urea in dilute electrolyte solution:

$$H_2NCONH_2 + H_2O \rightarrow 2NH_3 + CO_2 \quad (5)$$

In another example, $NH_3$ and $CO_2$ are generated through electrochemical oxidation of urea in concentrated electrolyte solution:

$$H_2NCONH_2 + H_2O \rightarrow N_2 + CO_2 + 3H_2 \quad (6)$$

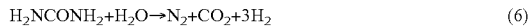

In another example, when the electrochemical cell 410 is powered by the power source, the second electrode 414 (cathode) is negatively charged and causes an electrolytic reaction in the cathode compartment 422 that generates $H_2$. In one example, the $H_2$ is generated through electrolysis of water in dilute electrolyte solution:

$$2H_2O \rightarrow 2H_2 + O_2 \quad (7)$$

In the embodiment shown in FIG. 4, the electrochemical cell 410 also includes the solid ionically conducting material 416 and the insulating layer 418. The solid ionically conducting material 416 is located between portions of the first and second electrode 412 and 414. In some embodiments, the ionically conducting material includes a proton conducting material configured to be impregnated with hydrophilic mineral particles, such as a solid polymer electrolyte (e.g., NAFION). The insulating layer 418 is also located between portions of the first and second electrode 412 and 414.

The gaseous products produced by the electrolytic reaction in the DEF 408 flowing from the DEF inlet 404 to the DEF outlet 406 form gas bubbles in the DEF 408 before the DEF 408 is sprayed out of the DEF outlet 406. The formation and size of gas bubbles in the DEF 408 affects the properties of the DEF 408 sprayed out of the DEF outlet 406. In some examples, the affected properties of the DEF 408 sprayed out of the DEF outlet 406 include one or more of a droplet size of the sprayed DEF 408, a DEF concentration in the droplets of the sprayed DEF 408, an amount of the sprayed DEF 408 that has been decomposed into effective reductants (e.g., $H_2$ and/or $NH_3$), and a uniformity of mixing of the sprayed DEF 408 with exhaust gas. In one example, the electrochemical cell 410 is configured such that a droplet size of DEF 408 sprayed out of the DEF outlet 408 when the electrolytic reaction occurs in the DEF 408 flowing from the DEF inlet 404 to the DEF outlet 406 is smaller than a droplet size of DEF 408 sprayed out of the DEF outlet 406 when the electrolytic reaction does not occur.

In some embodiments, a power source coupled to the DEF doser 400 is controlled to control one or more of the properties of the DEF 408 sprayed out of the DEF outlet 406. The formation and size of gas bubbles in the DEF 408 can also be used to accomplish other purposes, such as the clearing of buildup (e.g., DEF crystallization) from the DEF outlet 406. In some embodiments, the electrochemical cell is configured such that an applied voltage to the electrochemical cell 410 causes discharge of one or more DEF deposits at the DEF outlet 406. In some embodiments, the electrolytic reaction includes electro-active vaporization that includes water electrolysis in the DEF 408 flowing from the DEF inlet 404 to the DEF outlet 406 and accelerated production of the gaseous products in the DEF 408 flowing from the DEF inlet 404 to the DEF outlet 406.

Figure 5:
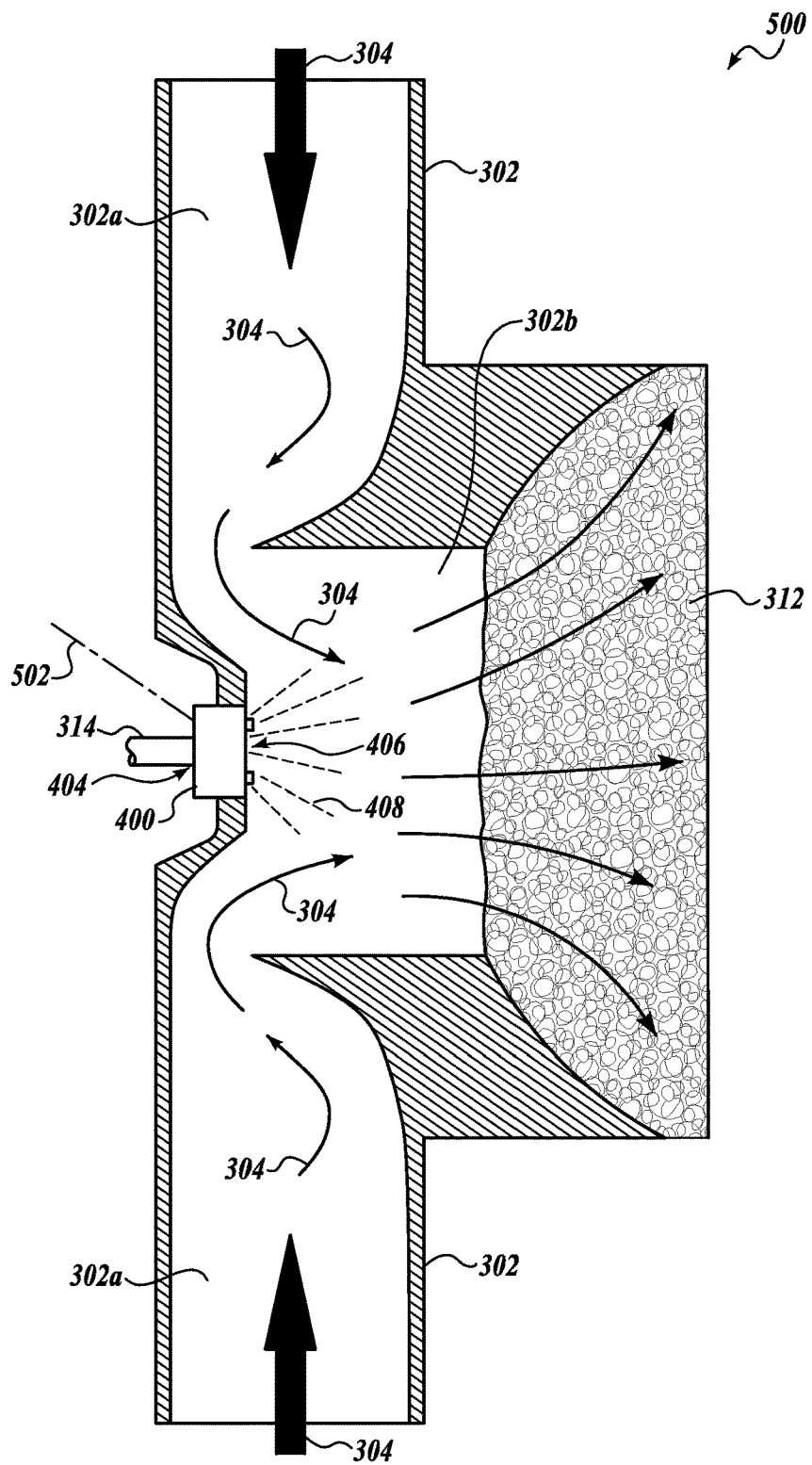
FIG. 5 depicts an embodiment of a system with the DEF doser depicted in FIG. 4 used with the exhaust pipe depicted in FIG. 3, in accordance with the embodiments described herein.

The DEF doser 400 depicted in FIG. 4 can be used in place of DEF dosers in any other situations, such as the DEF doser 108 in system 100, the DEF doser 208 in system 200, and the DEF doser 308 depicted in system 300. An embodiment of a system 500 with the DEF doser 400 used with the exhaust pipe 302 is shown in FIG. 5. In system 500, the DEF doser 400 is arrange to spray DEF 408 out of the DEF outlet 406 into the mixing pipe 302b to mix with the exhaust gas 304 before the exhaust gas 304 reaches the tortuous path static mixer. The DEF inlet 404 is coupled to the supply line 314 and the DEF inlet 404 is configured to receive DEF from the supply line 314.

The DEF doser 400 is also coupled to an electrical connection 502 that is couplable to a power source. The power source is configured to provide electrical power of the DEF doser 400 via the electrical connection. In some embodiments, the electrical connection 502 is a wired connection. In other embodiments, the electrical connection 502 is a wireless connection, such as an induction connection configured to provide electrical power via induction.

The electrochemical cell in the DEF doser 400, when coupled to the power source, causes an electrolytic reaction in the DEF flowing from the DEF inlet 404 to the DEF outlet 406 to produce gaseous products in the DEF flowing from the DEF inlet 404 to the DEF outlet 406. In some embodiments, the gaseous products produced in the electrolytic reaction in the DEF doser 400 cause the sprayed DEF 408 to mix with the diesel exhaust 304 in the mixing pipe 302b more rapidly than sprayed DEF 408 without the gaseous products mixed with the diesel exhaust 304 in the mixing chamber 302b.

While the system 500 depicted in FIG. 5 depicts the DEF doser 400 used with the exhaust pipe 302, the DEF doser 400 is capable of being used in any other system that doses DEF. For example, the DEF doser 400 is capable of being used in the system 100, in the system 200, or in any other DEF dosing system.

Figure 6:
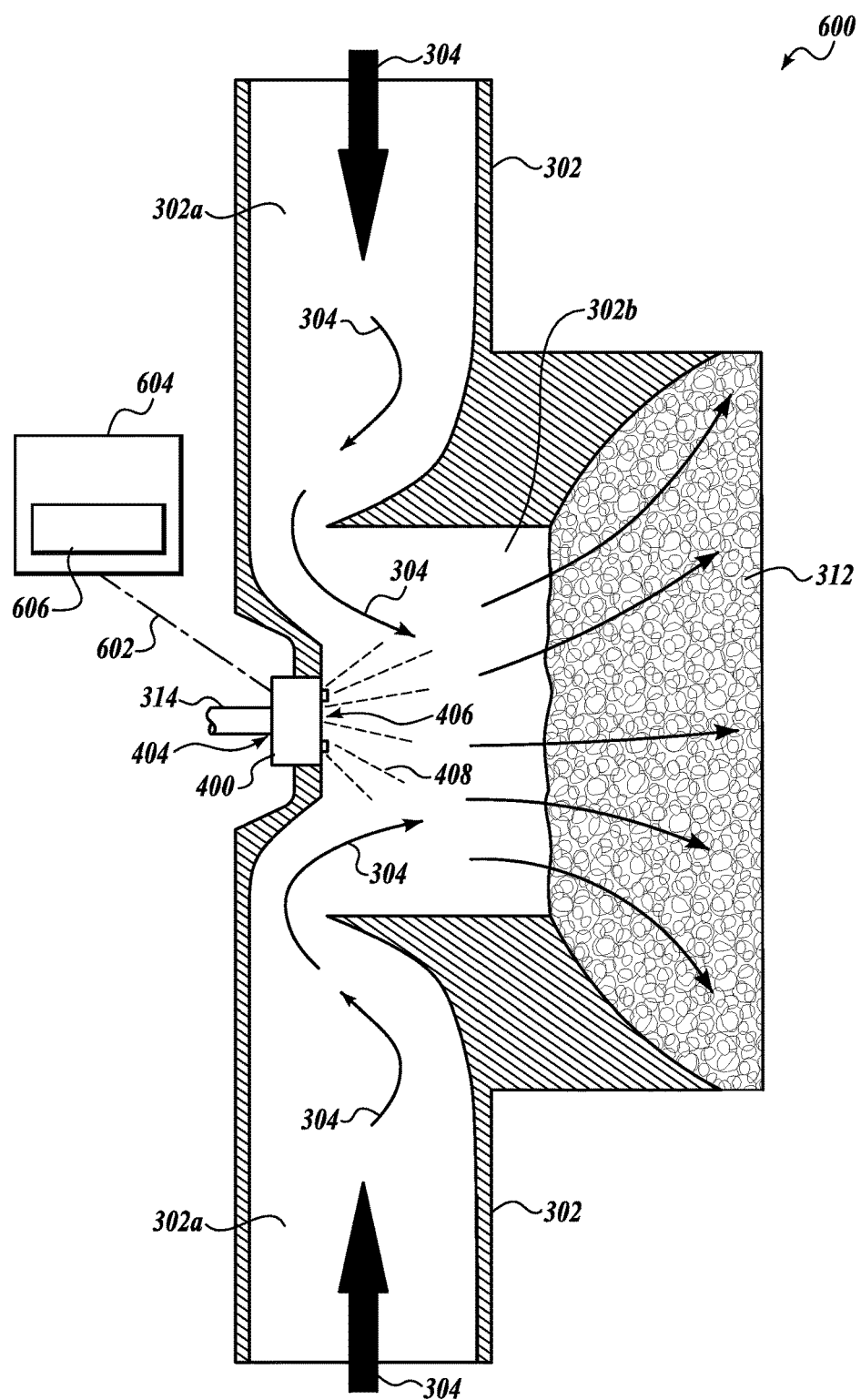
FIG. 6 depicts an embodiment of a system with the DEF doser depicted in FIG. 4 used with the exhaust pipe depicted in FIG. 3 and coupled to a power source, in accordance with the embodiments described herein.

An embodiment of a system 600 with the DEF doser 400 used with the exhaust pipe 302 and coupled to a power source is shown in FIG. 6. In the system 600, the DEF doser 400 is arrange to spray DEF 408 out of the DEF outlet 406 into the mixing pipe 302b to mix with the exhaust gas 304 before the exhaust gas 304 reaches the tortuous path static mixer 312. The DEF inlet 404 is coupled to the supply line 314 and the DEF inlet 404 is configured to receive DEF from the supply line 314.

The DEF doser 400 is also coupled to an electrical connection 602 that is coupled to a power source 604. In some embodiments, the electrical connection 602 is a wired electrical connection or a wireless electrical connection. In some embodiments, the DEF doser 400 and the exhaust pipe 302 are installed on a vehicle and the power source 604 is located on board the vehicle.

In some embodiments, the power source 604 is configured to provide an applied voltage to the DEF doser 400. In some embodiments, the power source 604 is coupled to a wave form generator 606 configured to vary electrical power from the power source 604. As shown in the embodiment depicted in FIG. 6, the power source 604 includes the wave form generator 606; however, in other embodiments, the wave form generator 606 is external to the power source 604. In some embodiments, the applied voltage (e.g., a constant voltage) and/or the variance of the applied voltage (e.g., a pulsed voltage) between the first and second electrodes are controlled to affect one or more of (i) kinetics of chemical reactions in a range of about 0 V to about 5 V, (ii) fast reversal of polarity (i.e., in a range of about 1 µs to about 1 ms) in a voltage range from about +5 V to about −5 V, (iii) control of gas bubble formation and size in the DEF flowing from the DEF inlet 404 to the DEF outlet 406, or (iv) synchronization of electro-activation with the pulsed flow dosing procedure (e.g., in accordance with current industry practices for DEF dosing). In some embodiments, these effects are controlled by controlling different frequencies and waveforms of the applied voltage.

In some embodiments, the voltage is applied voltage and/or the variance of the applied voltage between the first and second electrodes are controlled to affect multiple conditions. For example, a combination of effects (i) through (iii) in the precedent paragraph can be controlled occur over a spectrum of operating conditions, resulting in the production of a gas mixture enriched in $H_2$, $NH_3$, or other reductants from side reactions. The unreacted DEF in the spray is effectively concentrated by the water electrolysis process and highly dispersed by the simultaneous and sudden release of gas bubbles in the spray (sometimes called the "air assist effect"). This effect can facilitate one or more of: creation of a smaller droplet size in the spray than would otherwise be possible based upon the orifice size of the doser outlet alone, more efficient mixing of sprayed DEF with the exhaust gases, rapid water evaporation for the smaller and more concentrated DEF droplets to undergo decomposition by thermolysis, or potential for low temperature DEF dosing. In on embodiment, the potential for low temperature DEF dosing with an SCR system as low as 120° C. is possible in combination with a high efficiency urea hydrolysis catalyst, as described in U.S. patent application Ser. No. 14/934,955, the contents of which are hereby incorporated by reference in their entirety.

The power source 604 is capable of being operated under a variety of different conditions. In one embodiment, the power source 604 is configured to activate the electrochemical cell of the DEF doser 400 with an applied voltage up to about 10V. Unless otherwise specified herein, the term "about" means within 5% of a target value. In other embodiments, the power source 604 is configured to activate the electrochemical cell of the DEF doser 400 with a pulsed voltage in a range from about −10V to about 10V at a time interval between about 1 µs and about 1 ms. Under these conditions, a current density of the electrolytic reaction in the DEF flowing from the DEF inlet 404 to the DEF outlet 406 caused by the pulsed voltage is in a range from about 1 µA and about 1 mA. In some embodiments, the power source 604 is configured to drive the electrochemical cell of the DEF doser 404 with a pulsed voltage that is timed based on a pulsed flow pattern of DEF spray out of the DEF outlet 406. In some examples, the wave form generator 606 generates the pulsed voltage. In some embodiments, a droplet size of DEF 408 sprayed out of the DEF outlet 406 is controlled based on an applied voltage from the power source 604. In certain circumstances, DEF contains limited amounts of electrolyte species, which may limit current densities of the electrolytic reaction to a range from about 1 $\mu A/cm^2$ to about 1 $mA/cm^2$.

Among the benefits of the DEF doser 400 and other electro-active dosers described herein include one or more of the following: reduced DEF doser clogging by self-clearing, fewer SCR faults caused by DEF deposits serving as a form of $NH_3$ storage, improved DEF spray pattern, decreased DEF spray droplet size, pre-concentration of DEF in the DEF spray droplets by water electrolysis and/or accelerated vaporization from the sparging effect (i.e., electro-active vaporization), faster DEF decomposition resulting in reduced DEF deposit formation, potential for lower temperature dosing for cold start, improved NOx reduction efficiency (NRE), reduced catalyst aging and damage resulting from DEF byproducts forming deposits which may accumulate in the SCR, informed catalyst selection both for DEF hydrolysis and SCR catalysts, reduced DEF usage and cost, reduced $NH_3$ and HNCO slip, reduced warranty costs, possible design benefit (e.g., reduced size of decomposition pipe) to enable more compact engine aftertreatment system, enable new engine design and operation possibilities, or provide novel controls and on-board diagnostics (e.g., synchronized pulsed flow and electrochemical reductant generation, low temperature dosing protocol, etc.).

Figure 7:
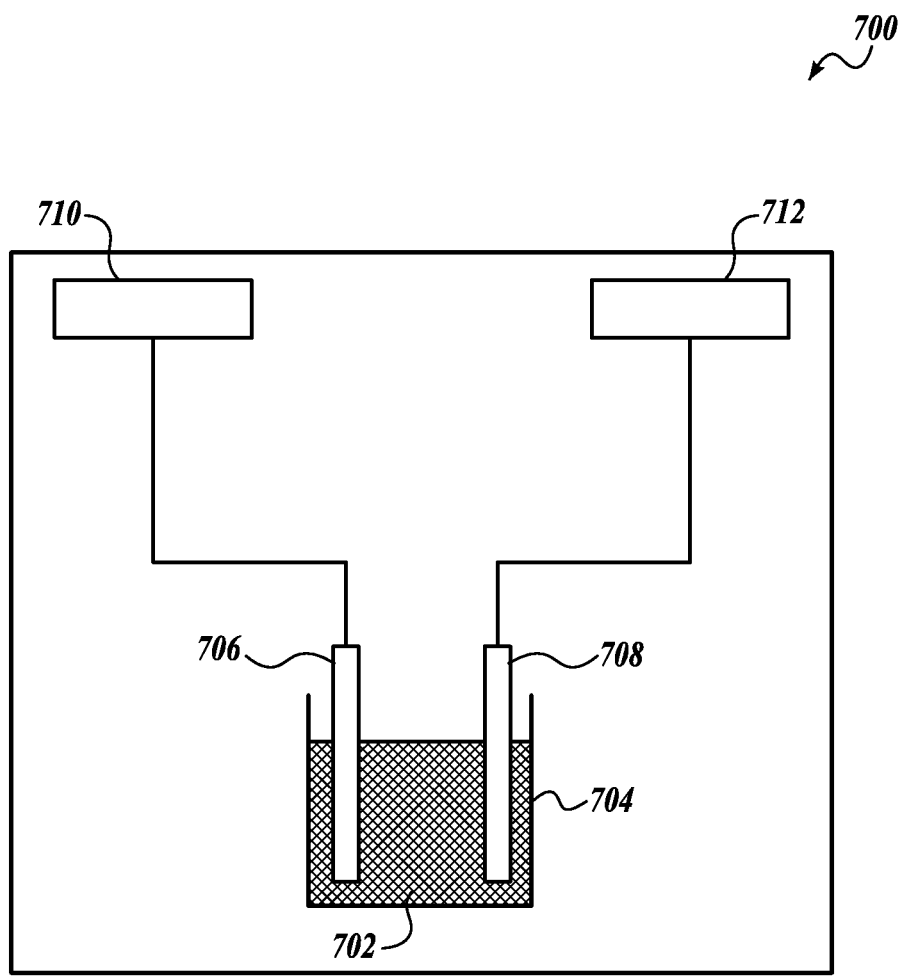
FIG. 7 depicts an embodiment of a test setup to test electrolytic reactions in DEF, in accordance with the embodiments described herein.

Experiments were conducted using a test setup 700 to test electrolytic reactions in DEF 702, as depicted in FIG. 7. The particular DEF 702 used in the experiments was a 32.5% urea solution. The DEF 702 was held in a container 704 (e.g., beaker) with a first electrode 706 and a second electrode 708 in the DEF 702. The materials of the first and second electrodes 706 and 708 were varied between a platinum screen configured in a cylindrical shape, a nickel wire, and a palladium wire. The first electrode 706 was electrically coupled to a multimeter 710 configured to operate in the mA range. The second electrode 708 was coupled to a power supply 712 configured to provide variable electrical power up to 30 V DC and up to 20 A. The multimeter 710 and the power supply 712 were electrically coupled to each other in series.

In a first example, the negative electrode (i.e., the cathode) was maintained as a palladium wire electrode, while the positive electrode (i.e., the anode) was either a platinum screen electrode or a nickel wire electrode. Therefore, $H_2$ gas was produced at the negative palladium wire electrode, while $NH_3$ gas was produced at the positive platinum screen or a nickel wire electrode. The effects of the applied constant voltage from this first example are shown in Table I.

TABLE I

Effect of Constant Voltage on Gas Bubble Formation

| Item # | Voltage (V) | Electrode Type | Bubble Point Voltage (V) | Size | Rate of Bubbling |
|---|---|---|---|---|---|
| 1 | 0.8-3.0 (slow scan) | $Pd^{(-)}$ vs $Pt^{(+)}$ | 1.2 | Fine | Slow |
| 2 | 1.2-5.0 (slow scan) | $Pd^{(-)}$ vs $Pt^{(+)}$ | 5 | Fine | Very Fast |
| 3 | 3 | $Pd^{(-)}$ vs $Ni^{(+)}$ | 3 | Large | Slow |

Items 1 and 2 in Table I were carried out by ramping the voltage by about 50 mV intervals, allowing 3-5 minutes of equilibration time, and observing the voltage at which bubbles were observed with the naked eye. The size and relative rate of bubbling were also recorded empirically.

It is evident from the data in Table I that the voltages required to produce fine bubbles at controlled bubbling rates are much lower for a platinum screen anode than for a nickel wire anode. This is consistent with oxidative processes in electrochemical reactions generally being always rate limiting and platinum being known as an effective catalyst for this process.

In a second example, the power supply 712 was replaced with a sweep function generator with an output frequency range from 0.1 Hz to 10 MHz with a 200 Hz digital multimeter oscilloscope for measuring both pulse width (i.e., the time interval) and amplitude (i.e., peak voltage).

While platinum has proven to be superior to nickel as an electrode material for electro-oxidation, nickel is far less expensive. Thus, it is desirable to find ways of achieving results with a nickel anode that are similar to or better than the results with a platinum anode shown in Table I. The results obtained using a nickel anode are shown in Table II.

TABLE II

Effect of Pulsed Voltage on Gas Evolution
Rate and Bubble Size for Nickle Anode

| Item # | Voltage (V)* | Electrode Type | Bubble Point Voltage (V) | Size | Rate of Bubbling |
|---|---|---|---|---|---|
| 1 | ±(0/4 V) | Pd$^{(-)}$ vs Ni$^{(+)}$ | Instantaneous | Fine | Fast |

*Voltage pulse width +10 ms

The results in Table II demonstrate that similar performance was accomplished for a nickel anode relative to a platinum anode (e.g., item 2 of Table I), at 1V lower bubble point vantage than that used with the platinum anode.

In a third example, palladium cathodes and nickel anodes were employed as a series of measurements were carried out with pulsed voltages to demonstrate self-cleaning, controlled gas bubble production for use in controlled electro-activated vaporization, and the like. The results of this example are shown in Table III.

TABLE III

Controlled Gas Bubbling Rate for Self-Cleaning
and Controlled Electro-Active Vaporization

| Item # | Voltage (V)* | Electrode Type | Bubble Point Voltage (V) | Size | Rate of Bubbling |
|---|---|---|---|---|---|
| 1 | ±(0/+5 V) | Pd$^{(+)}$ vs Ni$^{(-)}$ | PdO (black) | Fine | Fast |
| 2 | ±(0/-5 V) | Pd$^{(-)}$ vs Ni$^{(+)}$ | Pd (shiny metal) | Fine | Fast |
| 3 | ±(-4/+4 V) | Pd$^{(-)}$ vs Ni$^{(+)}$ | Pd (shiny metal) | Fine | Fast |
| 4 | ±(-1.5/+1.5 V) | Pd$^{(-)}$ vs Ni$^{(+)}$ | Pd (shiny metal) | Fine | Very Slow |
| 5 | ±(-2/+2 V) | Pd$^{(-)}$ vs Ni$^{(+)}$ | Pd (shiny metal) | Fine | Very Slow |
| 6 | ±(-2/+3 V) | Pd$^{(-)}$ vs Ni$^{(+)}$ | Pd (shiny metal) | Fine | Fast |

*Voltage pulse width +5 ms

As shown in the results of items 1 and 2 of Table III, the formation of palladium oxide (PdO black) occurred when used as the anode for oxidative reactions (item 1) and then reverted back to Pd metal within seconds upon reversing the polarity (item 2) under the same voltage regime. This dramatic visual demonstration illustrates that organic deposits which threaten to clog the doser outlet can be electro-actively removed.

As shown in the results of items 3-6 of Table III, pulsed voltage using relatively low voltages may be used to obtain effective bubbling size and rate results. Because these results can be obtained at low voltages, a DEF doser may be electro-activated with low electrical power to obtain such bubbling size and rate results. In addition, controlling electrical energy provided from the power source to an electro-activated DEF doser may result in control of gas bubble formation, gas bubble size, and/or gas bubbling rate. Such control over gas bubble creation in a DEF doser may be used to control one or more of electro-active evaporation, production of small particle size in DEF spray, uniform mixing of DEF spray with engine exhaust, acceleration of the rate of DEF decomposition, and the like.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A diesel exhaust fluid (DEF) doser, comprising:
   a DEF inlet configured to receive DEF, wherein the DEF includes a solution of urea and water;
   a DEF outlet configured to spray DEF out of the DEF doser; and
   an electrochemical cell located between the DEF inlet and the DEF outlet and couplable to a power source, wherein the electrochemical cell is configured such that, when DEF is flowing from the DEF inlet to the DEF outlet and when the electrochemical cell is coupled to the power source, the electrochemical cell causes an electrolytic reaction in the DEF flowing from the DEF inlet to the DEF outlet to produce gaseous products in the DEF flowing from the DEF inlet to the DEF outlet, and wherein the gaseous products comprise one or more of $H_2$ or $NH_3$, wherein the electrochemical cell comprises a compartment including a cathode and an anode electrode, wherein the compartment is configured to mix the gaseous products from the cathode and anode electrodes before the DEF outlet.

2. The DEF doser of claim 1, further comprising a wave form generator configured to vary electrical power from the power source.

3. The DEF doser of claim 1, wherein the anode and cathode electrodes are coupled to the power source, and wherein the anode and cathode electrodes line portions of the compartment.

4. The DEF doser of claim 3, wherein at least one of the cathode and anode electrodes comprises at least one of platinum, palladium, nickel, rhodium, ruthenium, tungsten, or titanium.

5. The DEF doser of claim 3, wherein at least one of the cathode and anode electrodes comprises a metal material of a porous sintered construction, the DEF doser further comprising:
   a solid ionically conducting material located between portions of the two electrodes.

6. The DEF doser of claim 5, wherein the ionically conducting material comprises a proton conducting material configured to be impregnated with hydrophilic mineral particles.

7. The DEF doser of claim 1, wherein the power source is configured to activate the electrochemical cell with an applied voltage up to about 10V.

8. The DEF doser of claim 1, further comprising a wave form generator, wherein the power source is configured to activate the electrochemical cell with a pulsed voltage in a range from about −10V to about 10V at a time interval between about 1 μs and about 1 ms.

9. The DEF doser of claim 8, wherein a current density of the electrolytic reaction in the DEF flowing from the DEF inlet to the DEF outlet caused by the pulsed voltage is in a range from about 1 $\mu A/cm^2$ and about 1 $mA/cm^2$.

10. The DEF doser of claim 1, wherein the power source is configured to drive the electrochemical cell with a pulsed voltage that is timed based on a pulsed flow pattern of DEF spray out of the DEF outlet.

11. The DEF doser of claim 1, wherein a droplet size of DEF spray out of the DEF outlet is controlled based on an applied voltage from the power source.

12. The DEF doser of claim 1, wherein the electrochemical cell is configured such that a droplet size of DEF spray out of the DEF outlet when the electrolytic reaction occurs in the DEF flowing from the DEF inlet to the DEF outlet is smaller than a droplet size of DEF spray out of the DEF outlet when the electrolytic reaction does not occur.

13. The DEF doser of claim 1, wherein the electrolytic reaction comprises electro-active vaporization, wherein the electro-active vaporization comprises water electrolysis in the DEF flowing from the DEF inlet to the DEF outlet and accelerated production of the gaseous products in the DEF flowing from the DEF inlet to the DEF outlet.

14. The DEF doser of claim 1, wherein the electrochemical cell is configured such that an applied voltage to the electrochemical cell causes discharge of one or more DEF deposits at the DEF outlet.

15. The DEF doser of claim 1, wherein the solution comprises 32.5% urea.

16. A diesel exhaust system, comprising:
a flow channel configured to direct diesel exhaust into a mixing chamber;
a diesel exhaust fluid (DEF) doser configured to spray DEF into the diesel exhaust in the mixing chamber, wherein the DEF includes a solution of urea and water; and
a power source coupled to the DEF doser and configured to provide an applied voltage to the DEF doser;
wherein the DEF doser comprises an electrochemical cell located between a DEF inlet and a DEF outlet, wherein the electrochemical cell is configured such that, when the applied voltage is provided by the power source, the electrochemical cell causes an electrolytic reaction in the DEF to produce gaseous products in the DEF before the DEF is sprayed into the mixing chamber, and wherein the gaseous products comprise one or more of $H_2$ or $NH_3$, wherein the electrochemical cell comprises a compartment including a cathode and an anode electrode, wherein the compartment is configured to mix the gaseous products from the cathode and anode electrodes before the DEF outlet to dose the mixed gaseous products from the doser to the mixing chamber with diesel exhaust.

17. The diesel exhaust system of claim 16, wherein the gaseous products produced in the electrolytic reaction cause the sprayed DEF to mix with the diesel exhaust in the mixing chamber more rapidly than sprayed DEF without the gaseous products mixed with the diesel exhaust in the mixing chamber.

18. The diesel exhaust system of claim 16, further comprising a wave form generator configured to vary electrical power in the applied voltage from the power source to the DEF doser.

19. The diesel exhaust system of claim 16, wherein the anode and cathode electrodes are coupled to the power source, and wherein the anode and cathode electrodes line portions of the compartment.

20. The diesel exhaust system of claim 19, wherein at least one of the anode and cathode electrodes comprises a metal material of a porous sintered construction, and wherein the DEF doser further comprises a solid ionically conducting material located between portions of the anode and cathode electrodes.

21. The diesel exhaust system of claim 20, wherein the ionically conducting material comprises a proton conducting material configured to be impregnated with hydrophilic mineral particles.

22. The diesel exhaust system of claim 16, wherein the solution comprises 32.5% urea.

* * * * *